United States Patent
Honkomp

(10) Patent No.: US 9,822,213 B2
(45) Date of Patent: Nov. 21, 2017

(54) FLAME RESISTANT FLEXIBLE POLYURETHANE FOAM

(71) Applicant: Dow Global Technologies LLC, Midland, MI (US)

(72) Inventor: David J. Honkomp, Canton, GA (US)

(73) Assignee: Dow Global Technologies LLC

(*) Notice: Subject to any disclaimer, the term of this patent is extended or adjusted under 35 U.S.C. 154(b) by 0 days.

(21) Appl. No.: 14/895,052

(22) PCT Filed: Jul. 22, 2014

(86) PCT No.: PCT/US2014/047522
§ 371 (c)(1),
(2) Date: Dec. 1, 2015

(87) PCT Pub. No.: WO2015/013226
PCT Pub. Date: Jan. 29, 2015

(65) Prior Publication Data
US 2016/0145377 A1    May 26, 2016

Related U.S. Application Data

(60) Provisional application No. 61/858,329, filed on Jul. 25, 2013.

(51) Int. Cl.
| | |
|---|---|
| C08G 18/78 | (2006.01) |
| C08G 18/63 | (2006.01) |
| C08G 18/08 | (2006.01) |
| C08G 18/40 | (2006.01) |
| C08G 18/48 | (2006.01) |
| C08G 101/00 | (2006.01) |

(52) U.S. Cl.
CPC ..... C08G 18/7831 (2013.01); C08G 18/0876 (2013.01); C08G 18/409 (2013.01); C08G 18/4072 (2013.01); C08G 18/485 (2013.01); C08G 18/632 (2013.01); C08G 18/78 (2013.01); C08G 18/7806 (2013.01); C08G 18/7812 (2013.01); C08G 2101/0008 (2013.01); C08G 2101/0058 (2013.01); C08G 2101/0083 (2013.01)

(58) Field of Classification Search
CPC .......... C08G 18/0876; C08G 18/78; C08G 18/7806; C08G 18/7812
See application file for complete search history.

(56) References Cited

U.S. PATENT DOCUMENTS

| | | |
|---|---|---|
| 3,954,825 A | 5/1976 | Touhey, Jr. et al. |
| 6,590,007 B2 | 7/2003 | Herrmann et al. |
| 6,734,217 B1 | 5/2004 | Herrmann et al. |
| 2003/0096884 A1* | 5/2003 | Nishida ............. C08G 18/6674 521/170 |
| 2011/0006579 A1 | 1/2011 | Hannig et al. |
| 2012/0108690 A1 | 5/2012 | Klesczewski et al. |
| 2014/0117271 A1 | 5/2014 | Plaver |

FOREIGN PATENT DOCUMENTS

| | | |
|---|---|---|
| DE | 102008025005 A1 | 11/2009 |
| JP | 10147623 A | 6/1998 |
| WO | 9838233 A1 | 9/1998 |
| WO | 2011003590 A2 | 1/2011 |
| WO | 2011007335 A2 | 1/2011 |

OTHER PUBLICATIONS

PCT/US2014/047522, International Search Report and Written Opinion dated Sep. 18, 2014.
PCT/US2014/047522, International Preliminary Report on Patentability dated 2060204

* cited by examiner

Primary Examiner — Melissa Rioja

(57) ABSTRACT

A method of forming a flame resistant flexible polyurethane foam that has a V-0 rating, according to Underwriters Laboratories Standard 94 Flammability Test, includes forming a reaction mixture that has an isocyanate component and an isocyanate-reactive component, and the isocyanate-reactive component includes a polyol component. The isocyanate component includes at least 30 wt % of a biuret modified aromatic diisocyanate, based on a total weight of the isocyanate component, and an isocyanate index of the reaction mixture is less than 100. The polyol component includes at least 5 wt % of a filled polyether polyol and at least 65 wt % of one or more other polyols that are different from the filled polyether polyol, based on a total weight of the isocyanate-reactive component.

7 Claims, No Drawings

FLAME RESISTANT FLEXIBLE POLYURETHANE FOAM

FIELD

Embodiments relate to a method of forming a flame resistant flexible polyurethane foam, and the flame resistant flexible polyurethane foam, that has a V-0 rating according to Underwriters Laboratories Standard 94 Flammability Test.

INTRODUCTION

Vehicle manufacturers are moving away from requiring a UL-94 V-2 rating (i.e., a flammability rating standard in which the material is demonstrated to stop burning within 30 seconds on a vertical specimen and drips of flaming particles may be realized, as defined by Underwriters Laboratories) for polyurethane products used under a hood of a vehicle. In this regard, vehicle manufacturers are now seeking polyurethane products that have a UL-94 V-0 rating (i.e., a flammability rating standard in which the material is demonstrated to stop burning within 10 seconds on a vertical specimen and only non-flaming drips of particles are realized, as defined by Underwriters Laboratories) for use in new vehicles. Accordingly, a flexible polyurethane product that meets the UL-94 V-0 flammability rating requirements is sought.

The flammability rating of a polyurethane product may be adjusted by using flame resistant additives that include solid flame retardants therein. The flame resistant additives may be solid flame retardants such as ammonium phosphate, melamine, and expandable graphite, as discussed in U.S. Patent Publication No. 2011/0006579, or may be a dispersion including solid flame retardants, e.g., red phosphorus dispersed in a liquid as discussed in U.S. Patent Publication No. 2012/0108690. However, the solid flame resistant additives are difficult to process (e.g., many solid flame retardants such as expandable graphite are not soluble in the components used to form a polyurethane product) and require the use of different dispensing equipment and processing equipment (e.g., equipment that continuously stirs the components that have the solid flame retardants therein to ensure a homogeneous distribution). Accordingly, an alternative formulation for forming a flexible polyurethane product that meets the requirements for a UL-94 V-0 rating and that addresses the solubility concerns associated with solid flame resistant additives is sought.

SUMMARY

Embodiments may be realized by providing a method of forming a flame resistant flexible polyurethane foam that includes forming a reaction mixture that has an isocyanate component and an isocyanate-reactive component, which includes a polyol component. The isocyanate component includes at least 30 wt % of a biuret modified aromatic diisocyanate, based on a total weight of the isocyanate component, and an isocyanate index of the reaction mixture is less than 100. The polyol component includes at least 5 wt % of a filled polyether polyol and at least 65 wt % of one or more other polyols different from the filled polyether polyol, based on a total weight of the isocyanate-reactive component. The method also includes forming a polyurethane foam that has a V-0 rating, according to Underwriters Laboratories Standard 94 Flammability Test, using the reaction mixture.

DETAILED DESCRIPTION

Embodiments relate to a flame resistant flexible polyurethane foam, and a method of forming thereof, that is formulated to meet the requirements to achieve a UL-94 V-0 flammability rating by using liquid components (such as a component in the liquid phase and/or a dispersion in which particles are dispersed in a continuous phase of a liquid phase component), in an effort to simplify the manufacturing process. The flame resistant flexible polyurethane foam excludes substantially any solid flame retardants while still realizing a UL-94 V-0 flammability rating. The flame resistant flexible polyurethane foam is useful in applications under the hood of a vehicle (e.g., near the engine) and other applications where the foam is exposed to heat over an extended period of time.

The flame resistant flexible polyurethane foam is a product of a reaction mixture that includes (1) an isocyanate component that has at least one polyisocyanate and (2) an isocyanate-reactive component that has at least a polyol component. According to an exemplary embodiment, the isocyanate component and the isocyanate-reactive component exclude substantially any solid flame retardants such as ammonium polyphosphate, melamine, expandable graphite, red phosphorus, and sodium citrate.

The isocyanate component includes one or more aromatic isocyanates. The one or more aromatic isocyanates may be at least one selected from the group of a diphenylmethane diisocyanate (MDI) and a toluene diisocyanate (TDI). Using at least one of its 2,4'-, 2,2'- and 4,4'-isomers, MDI may be in the form of, e.g., a polymeric, a prepolymer, a mixture, or a modified polymer. Using at least one of its 2,4 and 2,6-isomers, TDI may be in the form of a polymeric, a prepolymer, a mixture, or a modified polymer. The modified polymer of MDI and TDI may be prepared using at least one selected from the group of a biuret, a urethane, an allophanate, a urea, a carbodiimide, a uretonimine, and an isocyanurate moiety.

Of the one or more aromatic isocyanates in the isocyanate component, at least one is a biuret modified aromatic diisocyanate. For example, the biuret modified aromatic diisocyanate may be a liquid biuret modified MDI that has an average isocyanate content (i.e., NCO content) of 12 wt % to 50 wt % (e.g., 15 wt % to 40 wt %, 16 wt % to 30 wt %, etc.). The biuret modified MDI may have the following general structure:

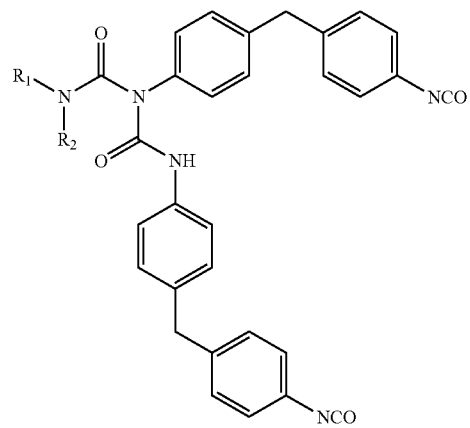

R1 and R2 may independently be an H, a linear, branched, or cyclic alkyl chain having 1 to 12 carbon atoms. The biuret modified MDI may include greater than 20 wt % of the 2,4' isomer of MDI and greater than 20 wt % of the 2,2' isomer of MDI (e.g., may include 50 wt % of the 2,4' isomer and 50 wt % of the 2,2' isomer of MDI).

The biuret modified aromatic diisocyanate accounts for at least 30 wt % of a total weight of the isocyanate component. For example, the biuret modified aromatic diisocyanate accounts for 30 wt % to 100 wt % (e.g., 30 wt % to 95 wt %, 35 wt % to 90 wt %, 40 wt % to 80 wt %, 45 wt % to 55 wt %, 50 wt % to 60 wt %, etc), based on the total weight of the isocyanate component. The biuret modified aromatic diisocyanate may be a polymer of at least one of the 2,4'-, 2,2'- and 4,4'-isomers of MDI. According to an exemplary embodiment, the isocyanate component includes from 40 wt % to 60 wt % (e.g., 45 wt % to 55 wt %, etc.) of the biuret modified MDI that includes the 2,4' isomer of MDI and the 2,2' isomer of MDI, based on the total weight of the isocyanate component.

In addition to the biuret modified aromatic diisocyanate, the isocyanate component may also include from 5 wt % to 50 wt % (e.g., 10 wt % to 40 wt %, 20 wt % to 30 wt %, 25 wt % to 45 wt %, etc.) of an aromatic diisocyanate mixture, based on the total weight of the isocyanate component. The aromatic diisocyanate mixture includes at least two different aromatic diisocyanates, e.g., a mixture of different isomers of MDI or TDI, or a mixture of isomers of both MDI and TDI. According to an exemplary embodiment, the aromatic diisocyanate mixture may include 50 wt % of 4,4'-methylene diphenyl isocyanate and 50 wt % of 2,4'-methylene diphenyl isocyanate, based on the total weight of the aromatic diisocyanate mixture, and the aromatic diisocyanate mixture accounts for 20 wt % to 30 wt % of the total weight of the isocyanate component.

In addition to the aromatic diisocyanate, and optionally in addition to the aromatic diisocyanate mixture, the isocyanate component may include from 5 wt % to 50 wt % (e.g., 10 wt % to 40 wt %, 20 wt % to 30 wt %, 25 wt % to 45 wt %, etc.) of another modified aromatic diisocyanate, based on the total weight of the isocyanate component. For example, the other modified aromatic diisocyanate may be a carbodiimide modified aromatic diisocyanate, an allophanate modified aromatic diisocyanate, an isocyanurate modified aromatic diisocyanate, an uretdione modified aromatic diisocyanate, an urethane modified aromatic diisocyanate, or an oxadiainetrione modified aromatic diisocyanate.

According to an exemplary embodiment, the other modified aromatic diisocyanate may be obtained by introducing carbodiimide or uretonimine groups into a MDI based polyisocyanate. The modified aromatic diisocyanate having the carbodiimide and/or uretonimine modified polyisocyanate may have an average NCO content from 25 to 35 wt %, and may include 2,4'-diphenylmethane diisocyanate in the form of a monomer and/or a carbodiimidization product thereof. For example, the modified aromatic diisocyanate may be a polycarbodiimide-modified aromatic diisocyanate that accounts for 20 wt % to 30 wt % of the total weight of the isocyanate-reactive component.

As would be understood by a person of ordinary skill in the art, the above weight percentages are calculated on a basis of 100 wt % for the total weight of the isocyanate component. Further, the isocyanate component may include other polyisocyanate compounds, in addition to the biuret modified aromatic diisocyanate, that do not have adverse influences on the performance of the desired flame resistance properties (and optionally provide sound deadening and vibration management properties) of the flexible polyurethane foam. For example, the other polyisocyanate compounds include isocyanate-terminal prepolymers, isopholone diisocyanate and modifications thereof, and xylene diisocyanates and modifications thereof.

The isocyanate-reactive component includes the polyol component, and optionally includes other components such as at least one selected from the group of a catalyst, a blowing agent, a pigment, a crosslinker, a surfactant, a cell opener, a chain extender, a filler, a colorant, an antioxidant, a preservative, and an acid scavenger. Further, the isocyanate-reactive component excludes substantially any halogenated flame and non-halogenated flame retardant additives (such as solid flame retardant additives that include any one of ammonium polyphosphate, melamine, expandable graphite, red phosphorus, sodium citrate, etc).

The polyol component includes one or more polyols, e.g., a mixture of polyether polyols or a mixture of polyether and polyester polyols. Suitable polyols include ones formed by reacting at least one of ethylene oxide and propylene oxide with at least one initiator containing from 2 to 8 active hydrogen atoms per molecule. Suitable initiators include, e.g., ethylene glycol, diethylene glycol, propylene glycol, dipropylene glycol, butane diol, glycerol, trimethylolpropane, triethanolamine, pentaerythritol, sorbitol, sucrose, and mixtures thereof. The polyether polyol may include at least one of ethylene oxide units and propylene oxide units, e.g., the polyether polyol may be an ethylene-oxide capped propylene oxide based polyether polyol. For example, the polyether polyol may be a polyoxyethylene polyoxypropylene polyol having an oxyethylene content of at least 10 wt % (e.g., from 10 wt % to 85 wt %). Other suitable polyols include polyesters that are obtained by the condensation of appropriate proportions of glycols and higher functionality polyols with polycarboxylic acids, hydroxyl terminated polythioethers, polyamides, polyesteramides, polycarbonates, polyacetals, polyolefins, and polysiloxanes. Polyols used for the preparation of the flexible polyurethane foams may have an average nominal hydroxyl functionality from 2 to 8, e.g., from 2 to 4.

At least one polyol of the polyol component is a filled polyether polyol that is represented by at least one of a polyurea filled polyether polyol and a polyhydrazodicarbonamide filled polyether polyol. The isocyanate-reactive component includes at least 5 wt % of the filled polyether polyol, and at least 65 wt % of one or more other polyols different from the filled polyether polyol, based on a total weight of the isocyanate-reactive component. For example, the filled polyether polyol is present in an amount from 5 wt % to 50 wt % (e.g., 10 wt % to 45 wt %, 10 wt % to 25 wt %, 15 wt % to 25 wt %, etc), based on the total weight of the isocyanate-reactive component.

The filled polyether polyol may be produced by, e.g., reaction with diisocyanate and diamine (which combine to form polyurea polyols) or reaction with dissocyanate and hydrazine (which combine to form polyhydrazodicarbonamide polyols) in liquid polyether. The filled polyether polyol includes, e.g., a polyether polyol and a composite (such as at least one selected from the group of a polyurea composite and a polyhydrazodicarbonamide composite). For example, the filled polyether polyol includes from 10 wt % to 40 wt % (e.g., 10 wt % to 30 wt %, 10 wt % to 20 wt %, 10 wt % to 25 wt %, 15 wt % to 25 wt %, etc.) of the composite, based on a total weight of the filled polyether polyol. According to an exemplary embodiment, the filled polyether polyol is a polyurea filled polyether polyol that includes from 10 wt % to 40 wt % (e.g. 15 wt % to 25 wt %) of a polyurea composite and a remainder of a propylene oxide based polyol, based on the total weight of the polyurea filled polyether polyol.

The polyurea filled polyether polyol are also known as Polyharnstoff Dispersion (PHD) polyethers. The polyurea filled polyether polyol includes a dispersion of polyurea in the polyol and may be formed in the in situ reaction between a di- or polyisocyanate and a diamine. The polyurea filled polyether polyol may be produced by the following reaction stages:

polyol component may include 20 wt % to 45 wt % (e.g., 25 wt % to 35 wt %, 30 wt % to 40 wt %, etc.) of a polyol having an average molecular weight of greater than 2500 (while still less than or equal to 5000), based on the total weight of the isocyanate-reactive component.

The mixture of polyols also includes, in addition to the low molecular weight polyol component, the high molecular weight polyol component. The mixture of polyols may include 5 wt % to 30 wt % (e.g., 5 wt % to 20 wt %, 10 wt % to 15 wt %, etc.) of the high molecular weight component,

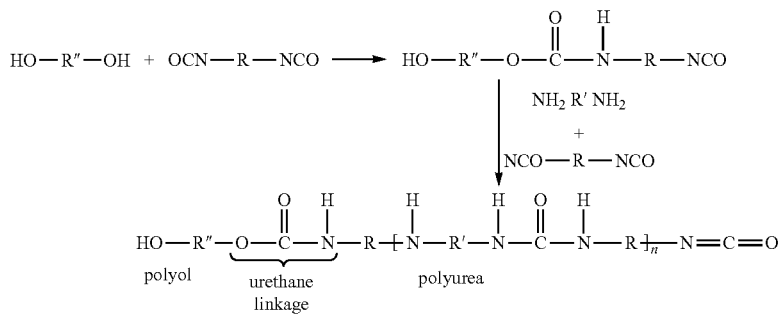

The polyol component may include another type of filled polyol in addition to the filled polyether polyol. For example, the polyol component may include at least one selected from the group of a graft polyether polyol (e.g., that includes a dispersed polymer that is a carbocatenary vinylic polymer or a copolymer obtained by radical polymerization) and a polyisocyanate poly addition (PIPA) polyol (e.g., a polyurethane dispersion). According to an exemplary embodiment, the polyol component includes 15 wt % to 40 wt % (e.g., 20 wt % to 30 wt %, 25 wt % to 29 wt %, etc.) of a grafted polyether polyol containing a dispersion of copolymerized styrene and acrylonitrile, based on the total weight of the isocyanate-reactive component. The grafted polyether polyol may be obtained by an in situ polymerization of styrene and/or acrylonitrile in polyoxyethylene polyoxypropylene polyols.

In addition to the filled polyether polyol (and optionally the other type of filled polyol), the polyol component may include a mixture of polyols having different molecular weights. For example, the mixture of polyols may include a low molecular weight polyol component having at least one polyol with an average molecular weight less than or equal to 5000 and a high molecular weight polyol component having at least one polyol with an average molecular weight greater than 5000. For example, the isocyanate-reactive component includes 30 wt % to 70 wt % (e.g., 40 wt % to 60 wt %, 45 wt % to 55 wt %, etc.) of the mixture of polyols, based on the total weight of the isocyanate-reactive component.

The mixture of polyols may include 20 wt % to 60 wt % (e.g., 25 wt % to 50 wt %, 30 wt % to 45 wt %, 35 wt % to 45 wt %, etc) of the low molecular weight polyol component, based on a total weight of the isocyanate-reactive component. The low molecular weight polyol component includes one or more polyols having an average molecular weight of less than or equal to 5000. For example, the low molecular weight polyol component includes 5 wt % to 20 wt % (e.g., 5 wt % to 10 wt %, 7 wt % to 15 wt %, etc.) of a polyol having an average molecular weight of less than or equal to 2500, based on the total weight of the isocyanate-reactive component. Further, the low molecular weight based on the total weight of the isocyanate-reactive component. The high molecular weight component includes one or more polyols having an average molecular weight greater than 5000.

As would be understood by a person of ordinary skill in the art, the above weight percentages are calculated on a basis of 100 wt % for the total weight of the isocyanate-reactive component. Further, other polyols that may be included in the polyol component, in addition to the filled polyether polyol, include other modified polyols and polymeric polyols (e.g., by the in situ reaction between a polyisocyanate and an amino- or hydroxyl-functional compound, such as triethanolamine).

The isocyanate-reactive component may further include a catalyst component. A total amount of the catalyst component in the isocyanate reactive component may be from 0.05 wt % to 5 wt % (e.g., from 0.01 wt % to 1.0 wt %), based on the total weight of the isocyanate-reactive component.

The catalyst component may include at least one tertiary amine catalyst. The tertiary amine catalyst is a compound that possesses catalytic activity for the reaction between a polyol and an organic polyisocyanate and has at least one tertiary amine group. The catalyst component of the isocyanate-reactive component may include one or more other catalysts, in addition to or instead of the tertiary amine catalyst. For example, the catalyst component may include at least one catalyst selected from the group of tin carboxylate-based catalysts and tetravalent tin-based catalysts.

The isocyanate-reactive component may also include a blowing agent such as water. Water may be used at below-ambient (as a liquid), ambient, or elevated temperature (e.g., as steam). If the water is not sufficient to obtain the desired density of the foam other ways to prepare a polyurethane foam may be employed such as the use of reduced or variable pressure, the use of a gas like air, $N_2$ and $CO_2$, the use of at least one other blowing agent like one of a chlorofluorocarbon, a hydrofluorocarbon, a hydrocarbon, and a fluorocarbon, the use of at least one other reactive blowing agent (i.e., agents that react with any of the ingredients in the reacting mixture and due to this reaction liberate a gas that causes the mixture to foam), the use of a specific catalyst that enhances a reaction that leads to gas formation, and combinations thereof.

The isocyanate-reactive component may include a cross-linker (e.g., in the form of an aminoalcohol) as an additional component, in an amount from 0.2 wt % to 0.75 wt %, based on the total weight of the isocyanate-reactive component. The isocyanate-reactive component may include a surfactant as another additional component, in an amount from 0.0015 wt % to 1.0 wt % based on the total weight of the isocyanate-reactive component. The surfactant may help to stabilize the foam as it expands and cures. Exemplary surfactants include nonionic surfactants and ionic surfactants.

A cell opener that functions during a polymerization reaction to break cell walls and promote the formation of an open cell structure may be present in the isocyanate-reactive component. A high open cell content (at least 25% by number, or at least 50%) may be beneficial for foams that are used in noise and vibration absorption applications such as under the hood of a vehicle. Exemplary cell openers include ethylene oxide homopolymers or random copolymers of ethylene oxide and a minor proportion of propylene oxide. A chain extender that has two isocyanate-reactive groups and an equivalent weight per isocyanate-reactive group of up to 499 (e.g., up to 250), may also be present in the isocyanate-reactive component. A filler that reduces overall cost and provides load bearing and other physical properties to the product may be included in the isocyanate-reactive component.

To manufacture the flame resistant flexible polyurethane foam, the isocyanate component and the isocyanate-reactive component that have been prepared are allowed to react with each other in a reaction mixture. When reacting the isocyanate component with the isocyanate-reactive component, the isocyanate index is less than 100 (e.g., less than any one of 95, 94, 93, 90, 85, 80, 75, etc.). As would be obvious to one of ordinary skill in the art, a minimum value of the isocyanate index is determined according to a minimum amount of isocyanate that may be used and still obtain a polyurethane foam product (e.g., an isocyanate index of 65). The isocyanate index is the equivalents of isocyanate groups (i.e., NCO moieties) present, divided by the total equivalents of isocyanate-reactive hydrogen containing groups (i.e., OH moieties) present, multiplied by 100.

Further, a weight percentage of the filled polyether polyol of the polyol component may be the same as or greater than a weight percentage of the biuret modified aromatic diisocyanate of the isocyanate component in the reaction mixture, in which the weight percentages are based on a total weight of the reaction mixture. The weight percentage of the filled polyether polyol in the reaction mixture may be from 5 wt % to 15 wt % (e.g., 10 wt % to 12 wt %), based on the total weight of the reaction mixture. The weight percentage of the aromatic biuret modified diisocyanate in the reaction mixture may be from 5 wt % to 15 wt % (e.g., 10 wt % to 12 wt %), based on the total weight of the reaction mixture.

The flexible polyurethane foam may be made by allowing the isocyanate component and the isocyanate-reactive component to react with each other, e.g., a slabstock process or in a closed mold molding process. Slabstock foam is formed as one piece of foam that is thereafter cut into the required shape and size dependent on the use. The closed mold molding process may be either a hot molding process or a cold molding process, in both of which a foam forming reaction takes place in a closed mold (which closed mold has been formed in accordance with the required shape and size dependent on the use). After the foam has cured, the mold is opened, and the flexible foam is removed.

The resultant flame resistant flexible polyurethane foam achieves a UL 94 flammability rating of V-0. The flame resistant flexible polyurethane foam is also characterized as being resilient, as determined using the ASTM D-3574 ball rebound test that measures the height a ball rebounds from the surface of a foam when dropped under specified conditions. The flame resistant flexible polyurethane foam may exhibit a resiliency of at least 40% (e.g., at least 50%), as measured according to ASTM D-3574. According to exemplary embodiments, the flame resistant flexible polyurethane foam may have a density from 64-160 kg/m$^3$ (as measured according to ASTM D 3574) and a tensile strength from 150 to 800 kPa (as measured according to ASTM D 3574).

The flame resistant flexible polyurethane foam according to embodiments may be suitable for use in flame resistant and noise and vibration-absorbing applications, e.g., the foams may be used for and/or molded into an article to be used as an engine cover, an engine noise insulator, a fuel injector encapsulant, a side cover, an oil pan cover, an undercover, a hood silencer, a dashboard silencer, an encapsulation of an engine parts, another article that is disposed around or in the vicinity of an engine of an automotive vehicle, or an article that reduces the amount of sound or noise that is transmitted from the engine. According to another embodiment, the flame resistant flexible polyurethane foam may be used for and/or molded into an article to be used as spacers or fillers for filling gaps or spaces between the engine and surrounding devices.

EXAMPLES

The following materials are principally used:
In the polyol component,

| | |
|---|---|
| Polyglycol EP 530 | A polyglycol block copolymer of ethylene oxide and propylene oxide, having an average molecular weight of 2000 (available from The Dow Chemical Company). |
| VORANOL ™ 4701 | A polyether polyol that is a glycerine initiated capped triol, having an average molecular weight from 4800 to 4900 and a nominal hydroxyl number of 35 mg KOH/g (available from The Dow Chemical Company). |
| SPECFLEX ™ NC 630 | A high molecular weight capped polyether polyol that is initiated by a mixture of glycerol and sucrose, having an average molecular weight of greater than 5000, and a functionality of 4.2, and an average hydroxyl number from 29 to 33 mg KOH/g (available from The Dow Chemical Company). |
| VORANOL ™ 4053 | A polyether polyol used as a cell opener that is glycerol and sucrose initiated, having a hydroxyl functionality of 6.9 and an average molecular weight of 12,500 (available from The Dow Chemical Company). |

-continued

| | |
|---|---|
| VORANOL ™ CP 1421 | A glycerol initiated polyoxypropylene - polyoxyethylene polyol that is ethylene oxide-terminated, having a hydroxyl functionality of 3, an average molecular weight of about 6000, and an average hydroxyl number of 32 mg KOH/g (available from The Dow Chemical Company). |
| SPECFLEX ™ 701.01 | A grafted polyether polyol containing 40% copolymerized styrene and acrylonitrile (available from The Dow Chemical Company). |
| Multranol ® 9151 | A polyurea-filled polyether polyol (20 wt % polyurea solids based on glycerine, propylene oxide, and 17 wt % of ethylene oxide) that is available as a highly viscous liquid having a hydroxyl functionality of 3, a viscosity of 3100 to 4100 mPa * s @ 25° C., and an average hydroxyl number of 28 mg KOH/g (available from Bayer MaterialScience). |
| DABCO ® 33 LV | A catalyst that is a solution of 33 wt % triethylendiamine (TEDA) diluted in 67 wt % of dipropylene glycol (available from Air Products & Chemicals, Inc.). |
| NIAX ™ A-1 | A tertiary amine catalyst (available from Momentive Performance Materials Inc). |

In the isocyanate component,

| | |
|---|---|
| ISOCYANATE A | A MDI based isocyanate mixture that includes 20 wt % of pure MDI, 15 wt % of a mixture of 4,4'-methylene diphenyl isocyanate, and 2,4'-methylene diphenyl isocyanate mixture, and 58 wt % of a biuret modified mixture of 50 wt % of 4,4'-methylene diphenyl isocyanate and 50 wt % of 2,4'-methylene diphenyl isocyanate. |
| VORALUX ™ HE 150 | A MDI based prepolymer (available from The Dow Chemical Company). |
| ISONATE ™ 143L | A modified MDI that is known as polycarbodiimide-modified diphenylmethane diisocyanate (available from The Dow Chemical Company). |
| ISONATE ™ 181 | A MDI based prepolymer produced by reacting high-purity diphenylmethane diisocyanate with sufficient glycol, having an average NCO content of 23.0 wt % (available from The Dow Chemical Company). |
| ISONATE ™ 240 | A MDI based prepolymer produced by reacting high-purity diphenylmethane diisocyanate with a high molecular weight polyester polyol, having an average NCO content of 18.7 wt % (available from The Dow Chemical Company). |
| PAPI ™ 94 | A polymeric MDI of 4,4'-methylene diphenyl diisocyanate, having an average isocyanate equivalent weight of 131 and an average NCO content of 32 wt % (available from The Dow Chemical Company). |
| ISONATE ™ 50 OP | A polymeric MDI mixture that includes 50 wt % of 4,4'-methylene diphenyl isocyanate and 50 wt % of 2,4'-methylene diphenyl isocyanate (available from The Dow Chemical Company). |
| Biuret modified MDI | A biuret modified mixture of 50 wt % of 4,4'-methylene diphenyl isocyanate and 50 wt % of 2,4'-methylene diphenyl isocyanate (based on the total amount of MDI), with a 2 wt % of water (based on a total amount of the biuret modified mixture) (available from The Dow Chemical Company). |

As shown below in Table 1, Example 1 demonstrates a polyurethane flexible foam, which is produced by forming a reaction mixture that includes the isocyanate-reactive component and the isocyanate component, that achieves a V-0 rating in a UL 94 Vertical Burning Test. The example foams are prepared by blending the isocyanate-reactive components according to the formulations in Tables 1 and 2, below, in respective suitable blending vessels to form blended isocyanate-reactive components. Each of the blended isocyanate-reactive components are then charged to one tank of a low pressure dispensing machine while the corresponding isocyanate component (according to the formulations in Tables 1 and 2, below) is charged to a second tank of the dispensing machine (or alternatively the samples may be prepared by using hand-mix techniques). The desired mix ratio is programmed into the dispensing machine and each of the blended isocyanate-reactive components is mixed with the corresponding isocyanate component to form the final reaction mixture. Component temperatures are approximately between 27° C. to 35° C. Each of the final reaction mixtures are immediately dispensed into a corresponding mold that is heated to 50° C. and that has a dimension of 200 mm×200 mm×40 mm. The mold is closed and the final reaction mixture is allowed to react and fill the mold at atmospheric pressure. A cured product is removed from the mold after 90 to 120 seconds. Total formulation weights for Example 1 and Comparative Examples 1-9 are 178-195 grams, with a resultant density of 7.0-7.7 lb/ft³ for the cured product.

Formulations used for producing the polyurethane foams are given in Tables 1 and 2. The cured formulations are aged for a minimum of seven days and taken for testing using the UL 94 Vertical Burning Test.

required at index of 100). The index of 100 is based on a one to one ratio for the equivalents of isocyanate groups (i.e., NCO moieties) and the equivalents of the isocyanate-reactive hydrogen containing groups (i.e., OH moieties).

In comparison to Example 1, the Comparative Examples 3 and 4 in Table 1, above, exclude a filled polyether polyol.

TABLE 1

|  | Example 1 | Comparative Example 1 | Comparative Example 2 | Comparative Example 3 | Comparative Example 4 |
|---|---|---|---|---|---|
| *Isocyanate-Reactive Component (by wt % in the isocyanate-reactive component)* | | | | | |
| Polyglycol EP530 | 9.50 | 9.50 | 9.50 | 9.50 | 9.50 |
| Voranol 4701 | 32.65 | 32.65 | 32.65 | 32.65 | 32.65 |
| Specflex NC 630 | 10.0 | 10.0 | 10.0 | 10.0 | 10.0 |
| Voranol CP 1421 | 1.50 | 1.50 | 1.50 | 1.50 | 1.50 |
| Specflex 701.01 | 28.0 | 28.0 | 28.0 | 43.0 | 43.0 |
| Multranol 9151 (PHD polyol) | 15.0 | 15.0 | 15.0 | — | — |
| Water | 1.80 | 1.80 | 1.80 | 1.70 | 1.70 |
| Dabco 33LV | 0.95 | 0.95 | 0.95 | 0.95 | 0.95 |
| Niax A-1 | 0.20 | 0.20 | 0.20 | 0.20 | 0.20 |
| Black pigment | 0.50 | 0.50 | 0.50 | 0.50 | 0.50 |
| *Isocyanate Component (by wt % in the isocyanate component)* | | | | | |
| Isonate 143L | 25.0 | 25.0 | 25.0 | 25.0 | 25.0 |
| Isonate 50 O,P | 25.0 | 25.0 | 25.0 | 25.0 | 25.0 |
| Biuret modified MDI | 50.0 | 50.0 | 50.0 | 50.0 | 50.0 |
| *Reaction Mixture Parameters* | | | | | |
| Isocyanate Index | 73 | 94 | 104 | 70 | 105 |
| Isocyanate to polyol weight ratio based on 100 grams of polyol as required at index of 100 | 39.0 | 39.0 | 39.0 | 37.1 | 37.1 |
| Isocyanate to polyol weight ratio used based on 100 grams of polyol | 28.5 | 36.7 | 40.6 | 26.0 | 39.0 |
| biuret modified MDI in the reaction mixture (wt %) | 11.1 | 13.4 | 14.4 | 10.3 | 14.0 |
| PHD polyol in the reaction mixture (wt %) | 11.7 | 11.0 | 10.7 | 0 | 0 |
| *Resultant Foam Properties* | | | | | |
| UL 94 Vertical Burning Test | V-0 | V-2* | V-2 | V-2 | V-2 |

*nine of the ten samples achieved a V-0 rating.

In comparison to Example 1, the Comparative Examples 1 and 2 in Table 1, above, are prepared at relatively higher isocyanate indices. The isocyanate indices are represented as the following: 100*(isocyanate compounds to polyol compounds weight ratio used based on 100 grams of the polyol compounds)/(isocyanate compounds to polyol compounds weight ratio based on 100 grams of the polyol compounds as The Comparative Example 5 in Table 2, below, is prepared using the filled polyether polyol Multranol® 9151 and excluding a biuret modified MDI. The Comparative Examples 6-8 are prepared using a biuret modified MDI and excluding a filled polyether polyol. The Comparative Example 9 is prepared excluding both a biuret modified MDI and a filled polyether polyol.

TABLE 2

|  | Comparative Example 5 | Comparative Example 6 | Comparative Example 7 | Comparative Example 8 | Comparative Example 9 |
|---|---|---|---|---|---|
| *Isocyanate-Reactive Component (by wt % in the isocyanate-reactive component)* | | | | | |
| Polyglycol EP530 | 9.56 | 9.56 | 9.50 | 9.50 | 9.56 |
| Voranol 4701 | 33.46 | 33.46 | 32.65 | 32.65 | 33.46 |
| Specflex NC 630 | 9.56 | 9.56 | 10.0 | 10.0 | 9.56 |
| Voranol 4053 | 1.43 | 1.43 | — | — | 1.43 |
| Voranol CP 1421 | — | — | 1.50 | 1.50 | — |
| Specflex 701.01 | 17.58 | 43.02 | 43.0 | 43.0 | 43.02 |
| Multranol 9151 (PHD polyol) | 25.44 | — | — | — | — |
| Water | 1.72 | 1.72 | 1.70 | 1.70 | 1.72 |
| Dabco 33LV | 0.96 | 0.96 | 0.95 | 0.95 | 0.96 |
| Niax A-1 | 0.19 | 0.19 | 0.20 | 0.20 | 0.19 |
| Black pigment | 0.10 | 0.10 | 0.50 | 0.50 | 0.10 |

TABLE 2-continued

| | Comparative Example 5 | Comparative Example 6 | Comparative Example 7 | Comparative Example 8 | Comparative Example 9 |
|---|---|---|---|---|---|
| Isocyanate Component (by wt % in the isocyanate component) | | | | | |
| Isocyanate A | 60.0 | — | — | — | — |
| Voralux HE 150 | 40.0 | — | — | — | — |
| Isonate 143L | — | 16.67 | 50.0 | 50.0 | 16.67 |
| Isonate 181 | — | 41.66 | — | — | 41.66 |
| Isonate 240 | — | 25.0 | — | — | 25.0 |
| Papi 94 | — | — | — | — | 16.67 |
| Isonate 50 O,P | — | — | — | — | — |
| Biuret modified MDI | — | 16.67 | 50.0 | 50.0 | — |
| Reaction Mixture Parameters | | | | | |
| Isocyanate Index | 90 | 90 | 70 | 90 | 90 |
| Isocyanate to polyol weight ratio based on 100 grams of polyol, required at index of 100 | 38.4 | 45.9 | 38.6 | 38.6 | 43.9 |
| Isocyanate to polyol weight ratio used based on 100 grams of polyol | 34.6 | 41.3 | 27.0 | 34.7 | 39.5 |
| Biuret modified MDI in the reaction mixture (wt %) | 8.9 | 4.9 | 10.6 | 12.9 | 0 |
| PHD polyol in the reaction mixture (wt %) | 18.9 | 0 | 0 | 0 | 0 |
| Resultant Foam Properties | | | | | |
| UL 94 Vertical Burning Test Result | V-2 | NR | V-2 | V-2 | V-2 |

The isocyanate index is measured as a ratio of the actual amount of isocyanate used to react with the polyol component in the isocyanate-reactive component relative to the theoretical amount of isocyanate that would be required to react with the polyol component, as multiplied by a base of 100. The UL 94 Vertical Burning Test Result refers to the UL 94 vertical flammability testing that is run according to Underwriters Laboratories Standard 94 using 0.5 inch (12.7 cm) by 0.5 inch by 5 inch foam samples (samples not meeting/failing the requirements for V-2 or V-0 according to UL 94 are indicated as NR for not rated). Samples are tested according to UL 94 protocol as molded (e.g., at ambient temperature for at least 24 hours) and after aging at 70° C. for 7 days (samples at ambient temperature for at least 24 hours after aging and before testing).

The invention claimed is:

1. A method of forming a flame resistant flexible polyurethane foam, the method comprising:
    forming a reaction mixture that includes an isocyanate component and an isocyanate-reactive component, the isocyanate-reactive component including a polyol component, wherein:
        the isocyanate component includes:
            from 40 wt % to 60 wt % of a biuret modified aromatic diisocyanate, based on a total weight of the isocyanate component, and the biuret modified aromatic diisocyanate being a diphenylmethane diisocyanate,
            from 5 wt % to 50 wt % of an aromatic diisocyanate mixture, based on the total weight of the isocyanate component, the aromatic diisocyanate mixture including at least two different aromatic diisocyanates, and
            from 5 wt % to 50 wt % of a polycarbodiimide-modified aromatic diisocyanate, based on the total weight of the isocyanate component, an isocyanate index of the reaction mixture being less than 100, and
        the polyol component includes at least 5 wt % of a filled polyether polyol and at least 65 wt % of one or more other polyols different from the filled polyether polyol, based on a total weight of the isocyanate-reactive component; and
    forming a polyurethane foam that has a V-0 rating, according to Underwriters Laboratories Standard 94 Flammability Test, using the reaction mixture.

2. The method as claimed in claim 1, wherein the polyol component includes from 5 wt % to 25 wt % of the filled polyether polyol, based on the total weight of the isocyanate-reactive component, the filled polyether polyol being a polyurea filled polyether polyol.

3. The method as claimed in claim 2, wherein the polyurea filled polyether polyol includes from 10 wt % to 40 wt % of a polyurea composite, based on a total weight of the polyurea filled polyether polyol.

4. A method of forming a flame resistant flexible polyurethane foam, the method comprising:
    forming a reaction mixture that includes an isocyanate component and an isocyanate-reactive component, the isocyanate-reactive component including a polyol component, wherein:
        the isocyanate component includes at least 30 wt % of a biuret modified aromatic diisocyanate, based on a total weight of the isocyanate component, an isocyanate index of the reaction mixture being less than 100,
        the polyol component includes at least 5 wt % of a filled polyether polyol and at least 65 wt % of one or more other polyols different from the filled polyether polyol, based on a total weight of the isocyanate-reactive component, wherein the one or more other polyols different from the filled polyether polyol include:
            15 wt % to 40 wt % of at least one second grafted polyether polyol, which is different from the filled polyether polyol, based on the total weight of the isocyanate-reactive component, 20 wt % to 60 wt % of at least one low molecular weight polyol having an average molecular weight of less than or equal to 5000, based on the total weight of the isocyanate-reactive component, and 5 wt % to 30 wt % of at least one high molecular weight polyol having an average molecular weight of greater than 5000, based on the total weight of the isocyanate-reactive component forming a polyurethane foam that has a V-0 rating, according to Underwriters Laboratories Standard 94 Flammability Test, using the reaction mixture.

5. The method as claimed in claim 1, wherein a weight percentage of the filled polyether polyol in the reaction mixture is greater than a weight percentage of the biuret modified aromatic diisocyanate in the reaction mixture, based on a total weight of the reaction mixture.

6. A method of forming a flame resistant flexible polyurethane foam, the method comprising:

forming a reaction mixture that includes an isocyanate component and an isocyanate-reactive component, the isocyanate-reactive component including a polyol component, wherein:

the isocyanate component includes at least 30 wt % of a biuret modified aromatic diisocyanate, based on a total weight of the isocyanate component, an isocyanate index of the reaction mixture being less than 90, the polyol component includes at least 5 wt % of a filled polyether polyol and at least 65 wt % of one or more other polyols different from the filled polyether polyol, based on a total weight of the isocyanate-reactive component, and an amount of the filled polyether polyol in the reaction mixture is from 10 wt % to 12 wt % and an amount of the biuret modified aromatic diisocyanate in the reaction mixture is from 10 wt % to 12 wt %, based on a total weight of the reaction mixture; and forming a polyurethane foam that has a V-0 rating, according to Underwriters Laboratories Standard 94 Flammability Test, using the reaction mixture.

7. The method as claimed in claim 1, wherein the reaction mixture excludes substantially any flame retardant additives including any one of ammonium polyphosphate, melamine, expandable graphite, red phosphorus, and sodium citrate.

* * * * *